United States Patent
Kanazawa

[11] Patent Number: 6,067,177
[45] Date of Patent: May 23, 2000

[54] METHOD FOR SUB-CARRIER MULTIPLEXED OPTICAL SIGNAL TRANSMISSION AND APPARATUS FOR SAME

[75] Inventor: Akihiro Kanazawa, Tokyo, Japan

[73] Assignee: NEC Corporation, Japan

[21] Appl. No.: 08/883,463

[22] Filed: Jun. 26, 1997

[30] Foreign Application Priority Data

Jun. 28, 1996 [JP] Japan .................................. 8-168945

[51] Int. Cl.[7] .................................................. H04J 14/02
[52] U.S. Cl. .......................................... 359/124; 359/182
[58] Field of Search .................................. 359/124, 154, 359/173, 181, 182

[56] References Cited

U.S. PATENT DOCUMENTS

| | | | |
|---|---|---|---|
| 5,661,580 | 8/1997 | Yamada ................................... | 359/126 |
| 5,790,289 | 8/1998 | Taga et al. .............................. | 359/124 |
| 5,896,216 | 4/1999 | Kikushima et al. ..................... | 359/182 |

FOREIGN PATENT DOCUMENTS

| | | | |
|---|---|---|---|
| 477699 | 4/1992 | European Pat. Off. ................ | 359/124 |
| 54034 | 2/1992 | Japan . | |
| 74034 | 3/1992 | Japan ................................... | 359/124 |
| 321824 | 12/1996 | Japan . | |

OTHER PUBLICATIONS

English–language Abstract of JP 4–54034, already of record, Feb. 1992.

S. Suzuki, et al., "Pulsed FM Single Subcarrier Optical Analog CATV Distribution System", The Institute of Electronics Informations and Communications Engineers, Autumn Conference, 1991, p. 4–63.

K. Kikushima, et al., "150–km Non–Repeated 60–Channel AM–Video Transmission Employing Optical Heterdyne AM/FM Converter", Proc. 21st Eur. Conf. on Opt. Comm. (ECOC '95—Brussels), pp. 1047–1050.

*Primary Examiner*—Thomas Mullen
*Attorney, Agent, or Firm*—Ostrolenk, Faber, Gerb & Soffen, LLP

[57] ABSTRACT

It is the object of the invention to provide a sub-carrier multiplexed optical signal transmission system employing super wide-band frequency modulation scheme, in which the SNR of a sub-carrier of a higher sub-carrier frequency is not decreased. The intensity of a sub-carrier of a higher sub-carrier frequency is increased by a pre-emphasizer, and modulated in a FM modulator. Then, a super wide-band FM signal is obtained. The super wide-band FM signal is supplied to the transmitter laser diode, and intensely modulated to obtain an optical signal. The optical signal is transmitted through an optical fiber, supplied to an optical receiver and converted into an electrical signal. The super wide-band FM signal thus obtained is demodulated by a FM demodulator. The sub-carrier multiplexed signal is supplied to a de-emphasizer having an inverse characteristic of that of the pre-emphasizer, wherein the signal supplied thereto recovers its original frequency spectrum.

5 Claims, 9 Drawing Sheets

METHOD FOR SUB-CARRIER MULTIPLEXED OPTICAL SIGNAL TRANSMISSION AND APPARATUS FOR SAME

FIELD OF THE INVENTION

The invention relates to a method for sub-carrier multiplexed optical signal transmission and an apparatus for the same, and especially to a method for sub-carrier multiplexed optical signal transmission employing a super wide-band frequency modulation scheme and an apparatus for the same.

BACKGROUND OF THE INVENTION

A sub-carrier multiplexed optical video signal transmission system employing a super wide-band frequency modulation scheme, in which sub-carrier multiplexed video signals are simultaneously converted into a single FM signal and a super wide-band FM signal thus obtained intensely modulates a transmitter laser, can suppress the effect of noise by wide-band improvement particular to FM transmission. Accordingly, the sub-carrier multiplexed optical video signal transmission system employing the super wide-band frequency modulation scheme is seen as a promising one providing a long transmission distance and permitting many splits, being especially suited for transmitting video signals, such as VSB-AM, for example, requiring extremely low noise. Concerning the optical sub-carrier multiplexed video signal transmission system employing super wide-band frequency modulation scheme, S. Suzuki and others presented a paper which is in the Autumn National Convention Record of IEICE of Japan, B-603, 4-63, 1991.

In the aforementioned FM based system, a white noise, which is superposed on a transmitted signal before the stage of demodulation, is converted into a particular noise, a rms value of which is proportional to frequency, and superposed on a demodulated signal at the stage of demodulation. In the aforementioned sub-carrier multiplexed optical video signal transmission system, the signal to noise ratio (SNR, hereinafter) of the sub-carrier decreases, as the frequency of the sub-carrier increases. Moreover, in the sub-carrier multiplexed optical video signal transmission system employing super wide-band frequency modulation scheme, it becomes necessary to modulate the frequency of a main carrier by the sub-carrier multiplexed video signals having an extremely wide frequency band. However, it is very difficult to provide a FM modulator having the extremely wide frequency band, hence, efficiency of modulation of the FM modulator inevitably decreases at frequencies near the highest end of the frequency band in many cases. Accordingly, the SNR of a sub-carrier with a higher sub-carrier frequency shows a tendency to decrease. Then, the transmission distance is limited to that of the sub-carrier channel with the lowest SNR, and it becomes difficult to increase the transmission distance.

SUMMARY OF THE INVENTION

Accordingly, it is an object of the invention to provide a method for sub-carrier multiplexed optical signal transmission employing super wide-band frequency modulation scheme, in which the dependence of the SNR of each sub-carrier on its sub-carrier frequency is decreased by so modulating the frequency of the main carrier that the SNRs of the all sub-carriers are equalized.

It is a further object of the invention to provide a method for sub-carrier multiplexed optical signal transmission employing super wide-band frequency modulation scheme, in which the dependence of the SNR of each sub-carrier on its sub-carrier frequency is decreased, and the SNRs of the all sub-carriers are equalized by so modifying the frequency spectrum of the super wide-band FM signal that its spectral component increases, as the frequency deviates from its center frequency.

It is a still further object of the invention to provide a sub-carrier multiplexed optical signal transmitting apparatus employing super wide-band frequency modulation scheme, in which the dependence of the SNR of each sub-carrier on its sub-carrier frequency is decreased, and the SNRs of the all sub-carriers are equalized by so modulating the frequency of a main carrier that the sub-carriers of higher sub-carrier frequencies more deeply modulate the frequency of the main carrier than other sub-carriers.

It is a yet further object of the invention to provide a sub-carrier multiplexed optical signal transmitting apparatus employing super wide-band frequency modulation scheme, in which the dependence of the SNR of each sub-carrier on its sub-carrier frequency is decreased, and the SNRs of all of the sub-carriers are equalized by so modifying the frequency spectrum of the super wide-band FM signal that its spectral component increases, as the frequency deviates from its center frequency, at the sending end of an optical transmission line.

It is an additional object of the invention to provide a sub-carrier multiplexed optical signal transmitting apparatus employing super wide-band frequency modulation scheme, in which the dependence of the SNR of each sub-carrier on its sub-carrier frequency is decreased, and the SNRs of all the sub-carriers are equalized by so modifying the frequency spectrum of the super wide-band FM signal that its spectral component increases, as the frequency deviates from its center frequency, at the receiving end of an optical transmission line.

According to a first feature of the invention, a method for sub-carrier multiplexed optical signal transmission, in which the sub-carrier multiplexed signals modulate a frequency of a main carrier to provide a single FM signal, the single FM signal intensely modulates a transmitter laser diode to generate an optical signal to be transmitted through an optical fiber, and the optical signal at a receiving end of the optical fiber is converted into received sub-carrier multiplexed signals, comprises a step of:

so modulating the frequency of the main carrier that sub-carriers showing lower signal to noise ratios after demodulation more deeply modulate the frequency of the main carrier than other sub-carriers.

According to the second feature of the invention, a method for sub-carrier multiplexed optical signal transmission, in which the sub-carrier multiplexed signals modulate a frequency of a main carrier to provide a single FM signal, the single FM signal intensely modulates a transmitter laser diode to generate an optical signal to be transmitted through an optical fiber, and the optical signal at a receiving end of the optical fiber is converted into received sub-carrier multiplexed signals, comprises a step of:

so modifying a frequency spectrum of the single FM signal that the spectral component thereof becomes larger, as the frequency deviates from a center frequency of the frequency spectrum.

According to the third feature of the invention, a sub-carrier multiplexed optical signal transmitting apparatus comprises:

a pre-emphasizer for increasing intensities of sub-carriers showing lower signal to noise ratios after demodulation more greatly than those of other sub-carriers, a FM modulator for converting a main carrier into a single FM signal by an output signal of the pre-emphasizer, an optical modulator for intensely modulating a signal light by the single FM signal to provide an optical signal, an optical fiber for propagating the optical signal therethrough, an optical receiver for optical/electrical-converting the optical signal propagated through the optical fiber into a single received FM signal, a FM demodulator for converting the single received FM signal into received sub-carrier multiplexed signals, and a de-emphasizer for decreasing intensities of sub-carriers having higher intensities comprised in the received sub-carrier multiplexed signals than those of other sub-carriers.

According to the fourth feature of the invention, a sub-carrier multiplexed optical signal transmitting apparatus comprises:

a FM modulator for converting a main carrier into a single FM signal by sub-carrier multiplexed signals, a pre-emphasizer for so modifying a frequency spectrum of the single FM signal that the frequency spectral component thereof increases, as the frequency deviates from a center frequency of the frequency spectrum, an optical modulator for intensely modulating a signal light by the single FM signal to provide an optical signal, an optical fiber for propagating the optical signal therethrough, an optical receiver for optical/electrical-converting the optical signal propagated through the optical fiber into a single received FM signal, a de-emphasizer for so modifying a frequency spectrum of the single received FM signal that spectral component of the single received FM signal is decreased, as frequency is apart from a center frequency of a spectrum of the single received FM signal, and a FM demodulator for demodulating an output signal of the de-emphasizer having the modified frequency spectrum.

According to the fifth feature of the invention, a sub-carrier multiplexed optical signal transmitting apparatus comprises:

a FM modulator for converting a main carrier into a single FM signal by sub-carrier multiplexed signals, an optical modulator for intensely modulating a signal light by the single FM signal to provide an optical signal, an optical fiber for propagating the optical signal therethrough, an optical receiver, which optical/electrical-converts the optical signal propagated through the optical fiber into a single received FM signal and has such a transimpedance that it decreases as its frequency deviates from a center frequency of a spectrum of the single received FM signal, a de-emphasizer for modifying a frequency spectrum of an output signal of the optical receiver in an inverse way of that of the optical receiver, and a FM de-modulator for converting an output signal of the de-emphasizer into received sub-carrier multiplexed signals.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
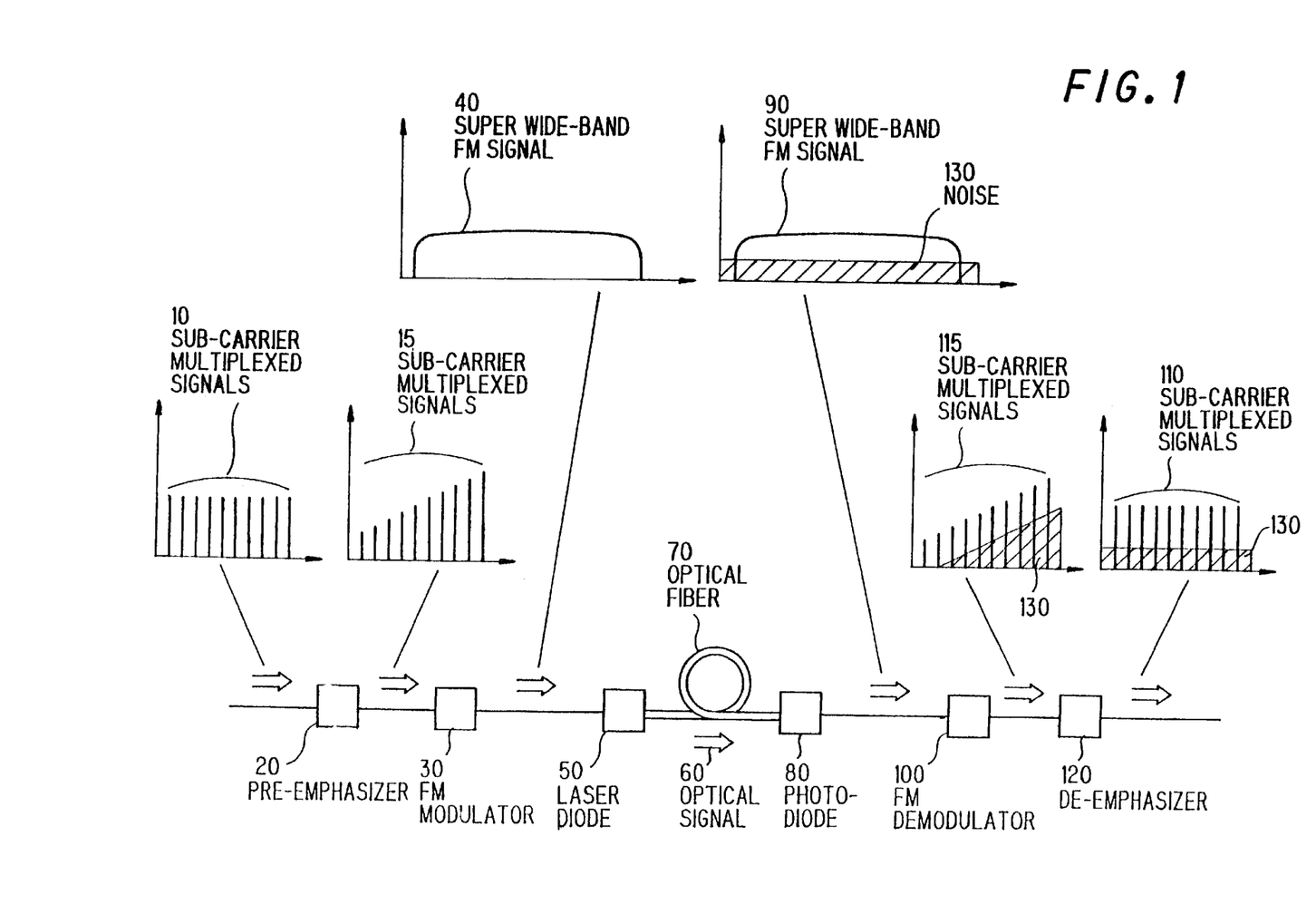
FIG. 1 is a block diagram showing the structure of the first preferred embodiment of the invention.

Next, embodiments of the invention will be explained referring to the appended drawings. FIG. 1 shows the block diagram of the first preferred embodiment of the invention. Sub-carrier multiplexed signals 10 are composed of sixty sub-carriers, which are respectively VSB amplitude modulated by signals to be transmitted and allocated over a frequency range extending over from 55.25 MHz to 409.25 MHz at an interval of 6 MHz. First, the sub-carrier multiplexed signals are supplied to a pre-emphasizer 20, in which the intensities of the sub-carriers are so adjusted that the intensities of the sub-carriers increase, as the frequencies of their sub-carriers increase. Thereafter, the sub-carrier multiplexed signals 10 are supplied a FM modulator 30 in order to be converted into a single FM signal ( a super wide-band FM signal, hereinafter). In the FM modulator 30, a main carrier of 2 GHz is frequency-modulated by the sub-carrier multiplexed signals. The modulation efficiency of the FM modulator 30 depends on the sub-carrier frequency illustrated as follows. For the input sub-carrier frequency of 403.25 MHz, the modulation efficiency is 90% of that for the input sub-carrier frequency less than 403.25 MHz, and for the input sub-carrier frequency of 409.25 MHz, the aforementioned efficiency decreases to 80% of that for the same. The signal 40 generated by the FM modulator 30 is supplied to a laser diode 50 and intensely modulates it. Then, an optical signal 60 is obtained as the output of the laser diode 50.

The optical signal 60 propagates through a single mode optical fiber 70 and supplied to a photodiode 80 in a receiving apparatus, where the optical signal 60 is converted into the super wide-band FM signal 90. The super wide-band FM signal 90 is demodulated by a FM-demodulator 100. The sub-carrier multiplexed signals 115 generated by the FM demodulator 100 is supplied to a de-emphasizer 120 having an inverse frequency characteristic of that of the pre-emphasizer 20, in which the intensities of the sub-carriers decrease, as the frequencies of their sub-carrier frequencies increase, and subsequently the sub-carrier multiplexed video signals 110 having equal intensities of the sub-carriers can be obtained.

Figure 2A:
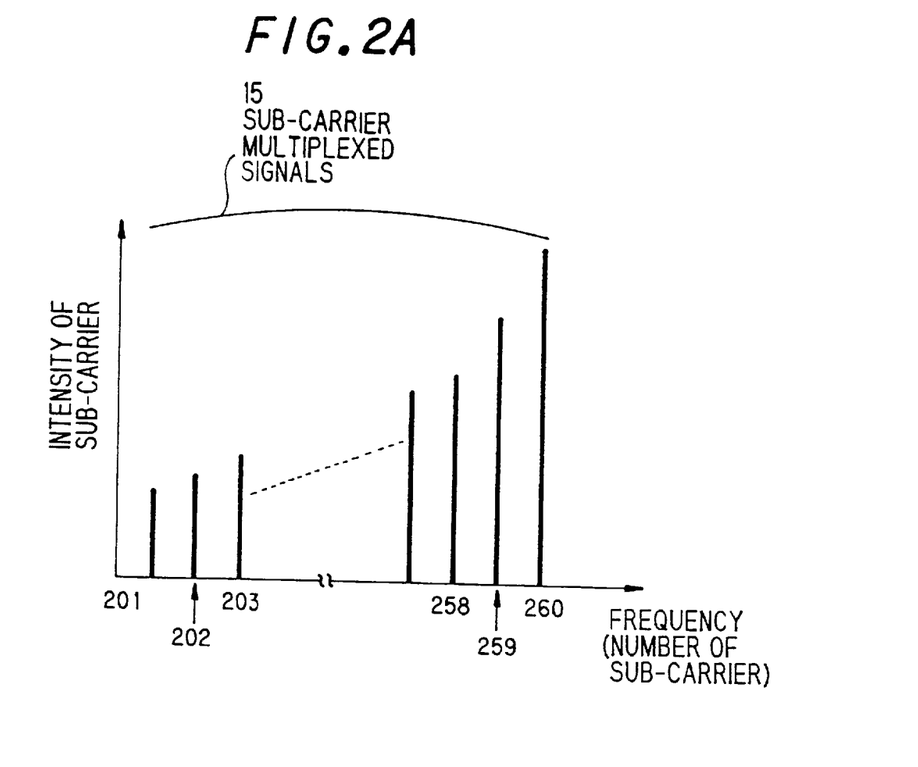
FIGS. 2A and 2B show frequency spectrums of signals in the first preferred embodiment of the invention, FIGS. 3A and 3B respectively show the structure of a pre-emphasizer and its frequency characteristic in the first preferred embodiment, FIGS. 4A and 4B respectively show the structure of a de-emphasizer and its frequency characteristic in the first preferred embodiment of the invention.

As shown in FIG. 2A, the sub-carrier multiplexed signals supplied to the FM modulator 30 are composed of the sub-carriers 201 to 260. The lowest sub-carrier frequency corresponding to the sub-carrier 201 is denoted by $f_1$, and the sub-carrier frequency of the i-th sub-carrier counting from 201 is denoted by $f_i$. In the pre-emphasizer 30, the intensity of the i-th sub-carrier is converted into a value equal to that of the sub-carrier 201 multiplied by a factor of $(f_i/f_1)$. Moreover, in order to compensate the decrease of efficiency of the FM modulator 30, the intensities of the sub-carriers 259 and 260 are respectively converted into values equal to that of the sub-carrier 201 multiplied by factors of $(f_{59}/f_1) \times (1/0.9)$ and $(f_{60}/f_1) \times (1/0.8)$.

Figure 2B:
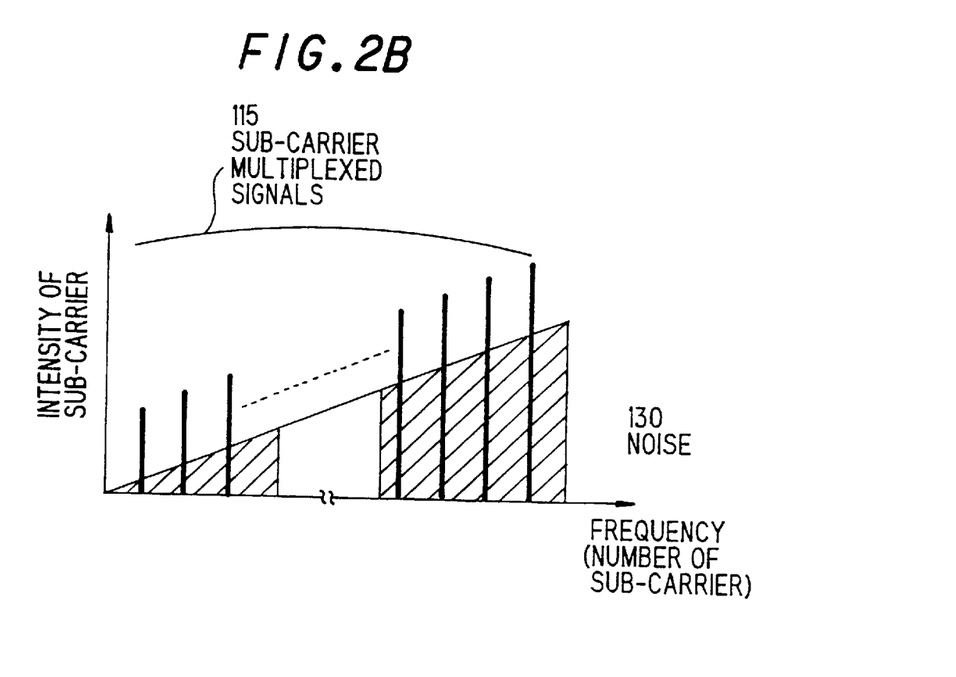

As shown in FIG. 2B, the intensities of the sub-carriers in the sub-carrier multiplexed signals 115 supplied from a FM-demodulator 100 are respectively proportional to their frequencies. Since the rms value of noise generated by the FM demodulator 100 is proportional to frequency, SNR of each sub-carrier has the same value.

Figure 3A:
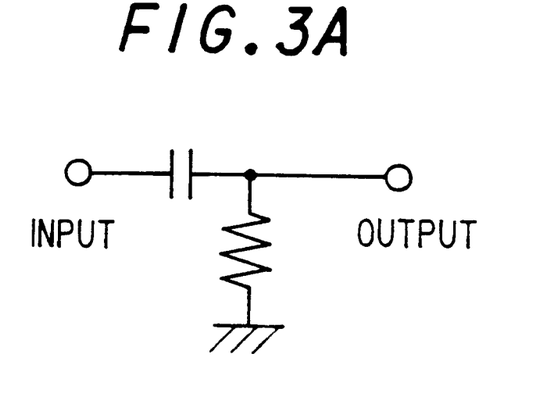
Figure 3B:
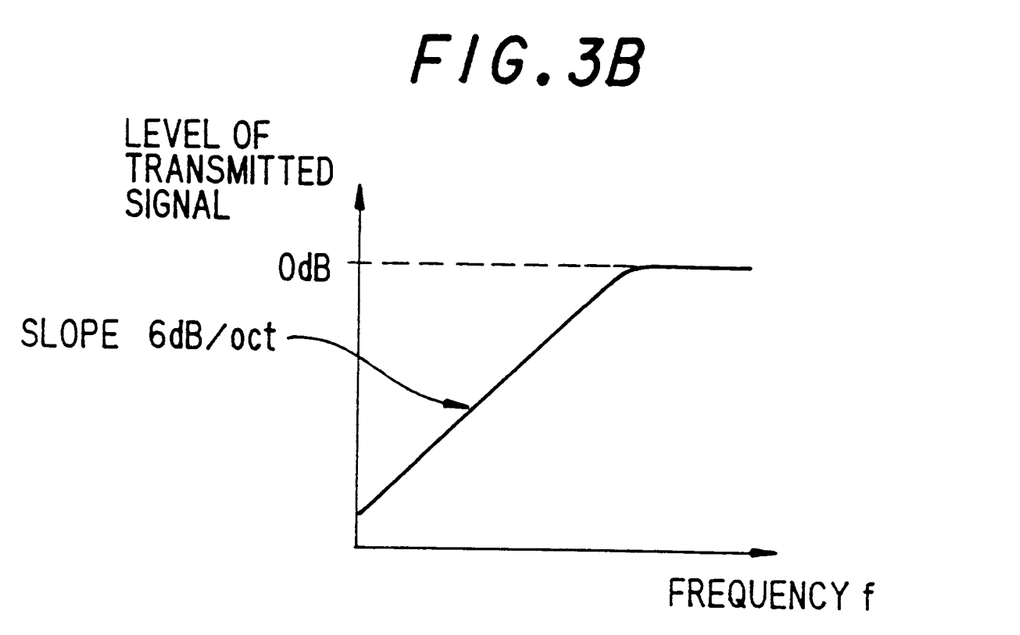
Figure 4A:
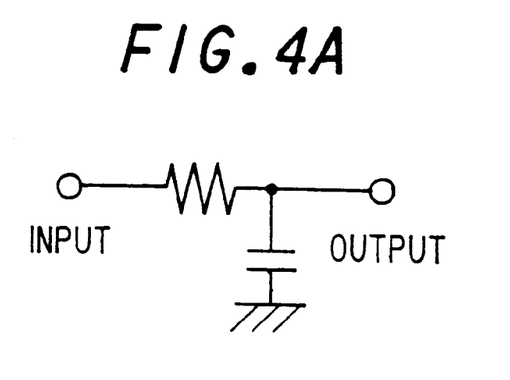
Figure 4B:
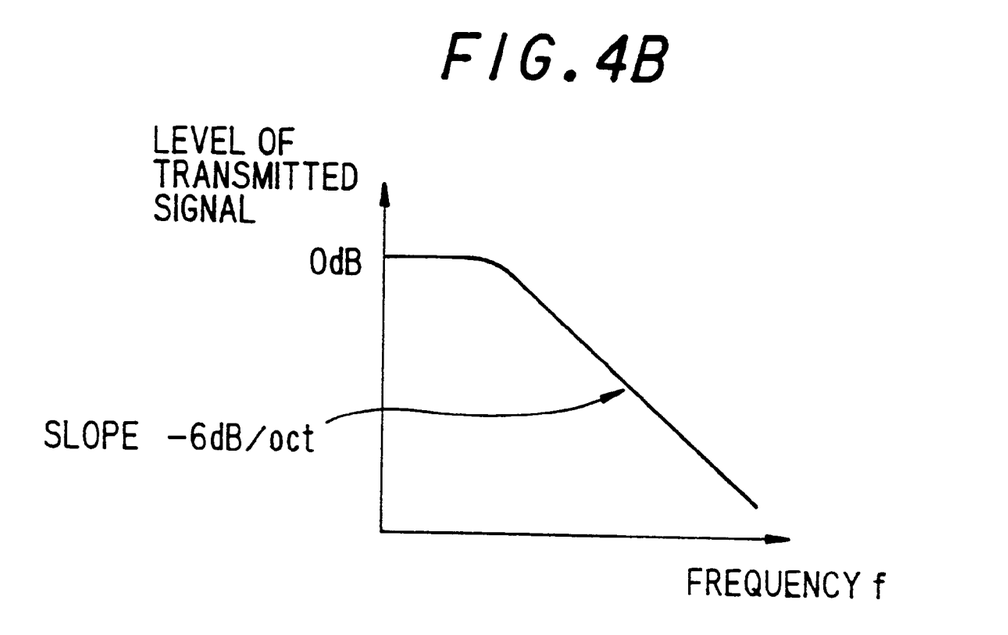

The pre-emphasizer 20 for adjusting the sub-carrier intensities is realized by a high-pass-filter circuit shown in FIG. 3A, for example, and the frequency characteristic of the transmitted signal level thereof is shown in FIG. 3B. The de-emphasizer 120 can be realized by a low-pass-filter circuit shown in FIG. 4A, and the frequency characteristic of the transmitted signal level thereof can be represented by FIG. 4B.

As mentioned in the above, in this embodiment of the invention, the intensities of the sub-carriers, which show low SNRs after FM demodulation, are increased before the stage of FM modulation. In other words, the intensities of the respective sub-carriers are so adjusted that the SNRs after demodulation of the sub-carriers are equal to each other, based on the fact that, when a white noise voltage is superposed on the FM signal before demodulation, the white noise is converted into a particular noise, a rms value of which is proportional to the sub-carrier frequency, in the stage of demodulation. Accordingly, when the super wide-band FM signal is converted into the optical signal and demodulated after being propagated through the optical fiber, the noises superposed on the respective sub-carriers are proportional to their sub-carrier frequencies, and the intensities of the sub-carriers are proportional to their sub-carrier frequencies, too. Thus, the SNRs of the all sub-carriers are equal to each other. Even in case that, the band-width of the FM modulator 100 is not sufficiently wide and the efficiencies of modulation decrease for some sub-carriers of nearly highest sub-carrier frequencies, the SNRs of these channels can be improved by more greatly increasing their intensities in the pre-emphasizer 20 and supplying them to the FM demodulator 100.

Figure 5:
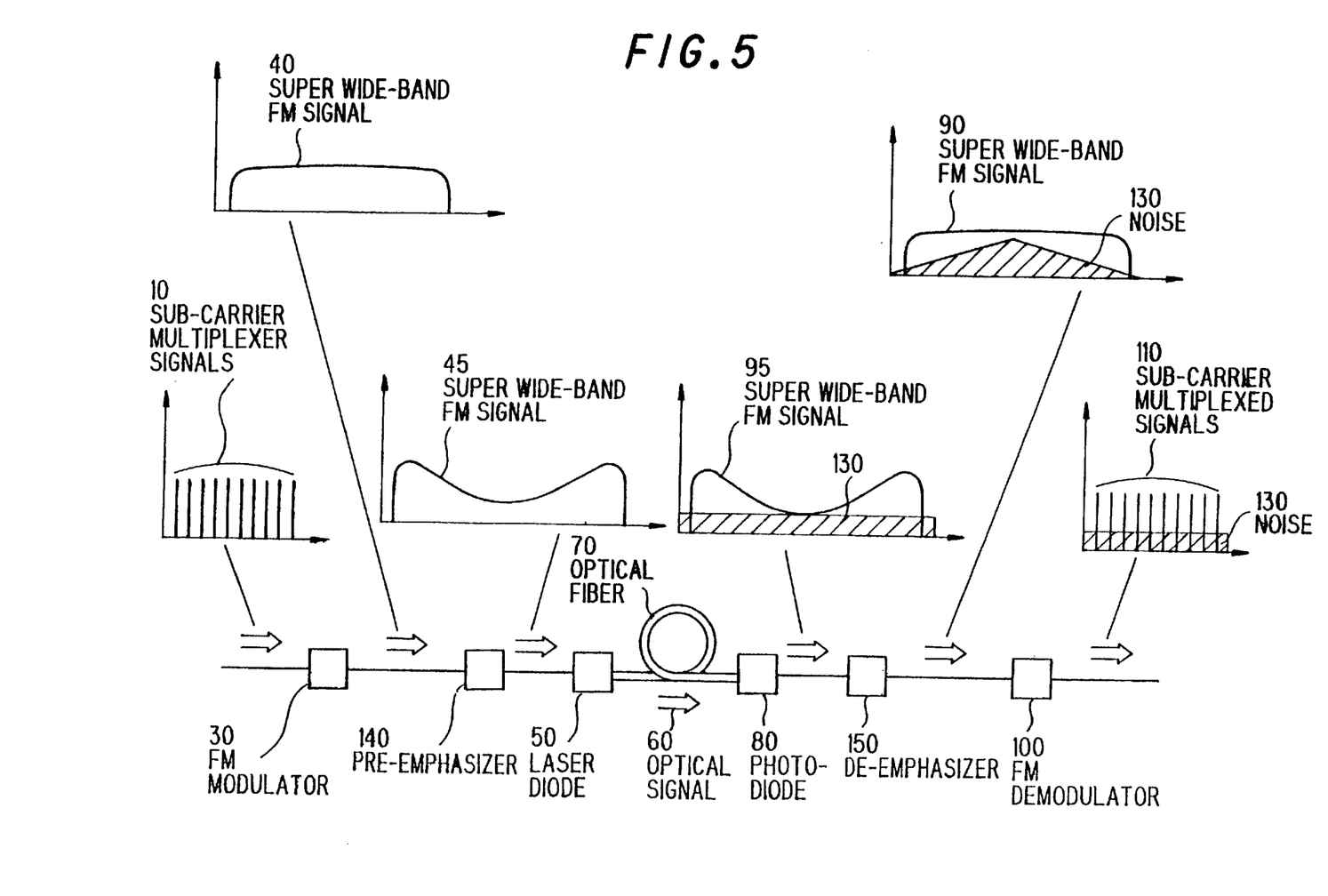
FIG. 5 is a block diagram showing the structure of the second preferred embodiment of the invention, FIGS. 6A to 6E respectively show frequency spectrums of signals in the second preferred embodiment of the invention, FIGS. 7A and 7B respectively show the structure of a pre-emphasizer and its frequency characteristic in the second preferred embodiment of the invention, FIGS. 8A and 8B respectively show the structure of a de-emphasizer and its frequency characteristic in the second preferred embodiment of the invention.

FIG. 5 shows the structure of the second preferred embodiment of the invention. In the first preferred embodiment shown in FIG. 1, the SNR of each sub-carrier signal is equalized by setting the pre-emphasizer 20 at the previous stage of the FM modulator 30 and the de-emphasizer 120 at the next stage of the FM-demodulator 100. On the other hand, in the second preferred embodiment shown in FIG. 5, the same purpose can be achieved by setting the pre-emphasizer 140 at the next stage of the FM modulator 30 and the de-emphasizer 150 at the previous stage of the FM demodulator 100 and modifying the frequency spectrum of the super wide-band FM signal by the de-emphasizer 150. In the transmission system shown in FIG. 5, the noise level of the super wide-band FM signal becomes maximal at the center frequency of its frequency spectrum, being allocated near the main carrier frequency.

Figure 6A:
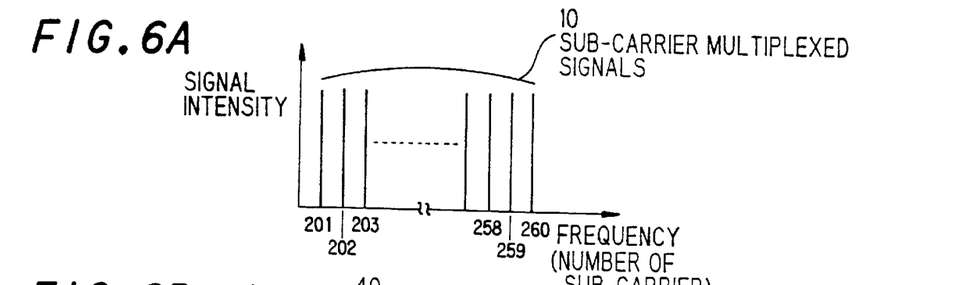
Figure 6B:
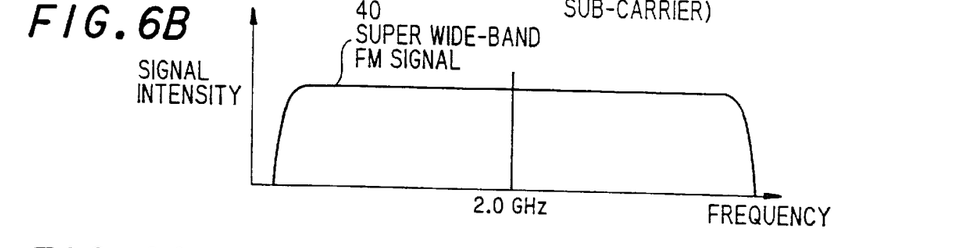
Figure 6C:
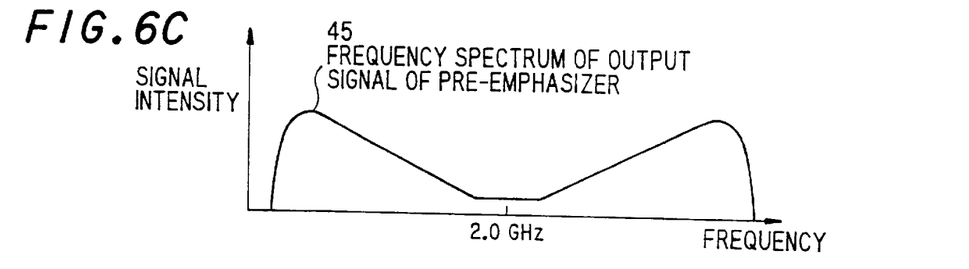

As shown in FIG. 6A, the sub-carrier multiplexed signals 10 are the same as those in the first preferred embodiment. The pre-emphasizer 140 converts the frequency spectrum of the super side-band FM signal 40, which is obtained by modulating the frequency of the main carrier of 2 GHz by the sub-carrier multiplexed signals 10, in a following way. The converted frequency spectral component of the super wide-band FM signal is proportional to $(f-2000)^2$ where frequency f( MHz ) is lower than 1950 MHz and higher than 2050 MHz, and is constant where f is higher than 1950 MHz and lower than 2050 MHz, and thereby a super wide-band FM signal 45 having a frequency spectrum shown in FIG. 6C can be obtained.

Figure 6D:
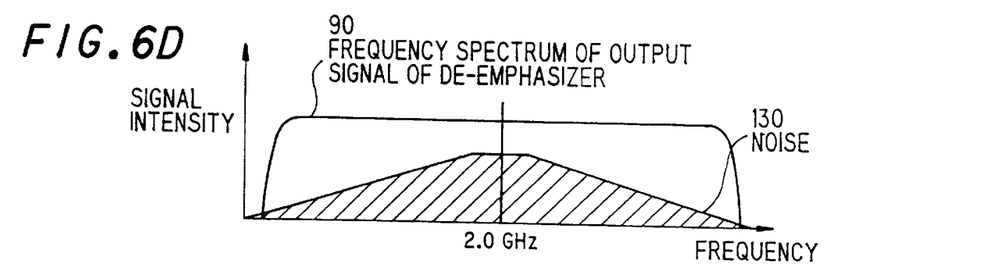
Figure 6E:
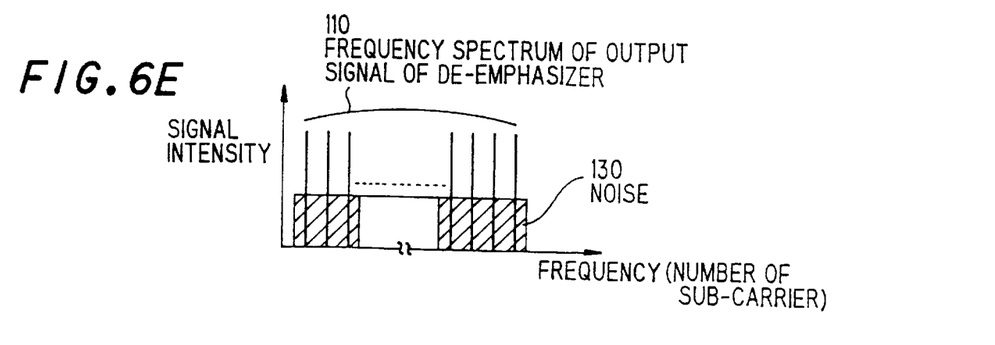

If the modified super wide-band FM signal 45 is converted into an optical signal and transmitted through an optical fiber 70 similarly to the case of the first preferred embodiment, the output signal of the photodiode 80 is given as a superposition of the input signal 95 and the white noise 130. These voltages are supplied to a de-emphasizer 150, having an inverse frequency characteristic of that of the pre-emphasizer 140, which so converts the signal component of the input voltage that it recovers the initial frequency spectrum of the signal intensity. In other words, the super wide-band FM signal 90, having the same frequency spectrum as that of the output signal 40 of the FM-modulator 30, can be obtained. In the aforementioned process, the spectrum of the noise 130 is simultaneously converted in the de-emphasizer 150. Then, the spectral component of the frequency spectrum of the noise 130 thus converted decreases, as frequency deviates from the center frequency of the frequency spectrum. So that, the frequency spectrum of the output voltage of the de-emphasizer 150 can be represented as shown in FIG. 6D. The super wide-band FM signal 90 is demodulated by the FM demodulator 100, and supplied to a next stage as sub-carrier multiplexed signals 110, as shown in FIG. 6E. Since the spectral component of the noise supplied to the FM-demodulator 100 becomes smaller, as frequency deviates from the center frequency, the noise supplied from the FM-demodulator 100 uniformly distributes over the whole frequency range, and the SNRs of the respective sub-carriers are the same.

Figure 7A:
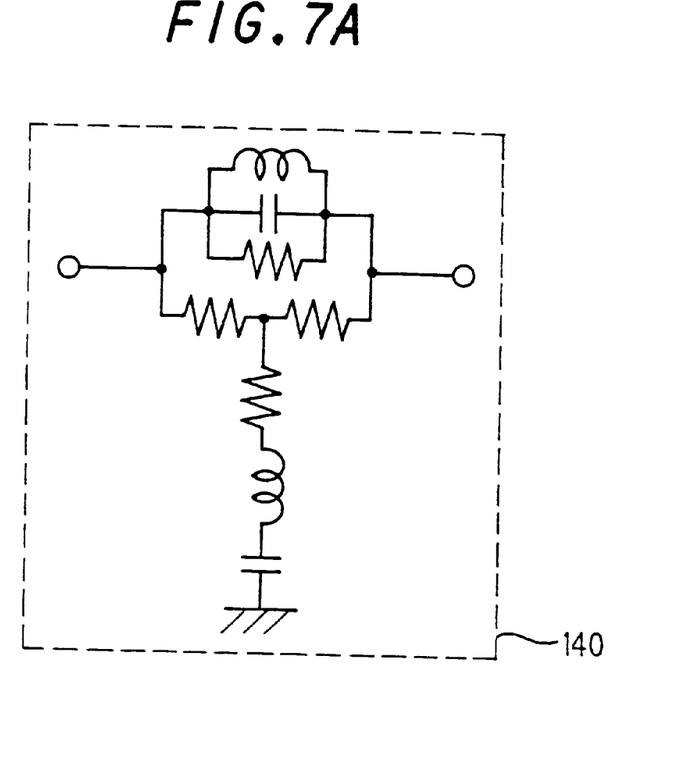
Figure 7B:
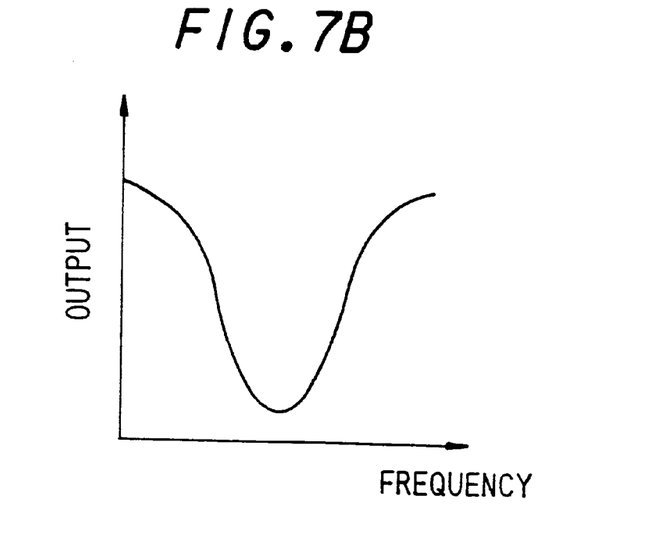
Figure 8A:
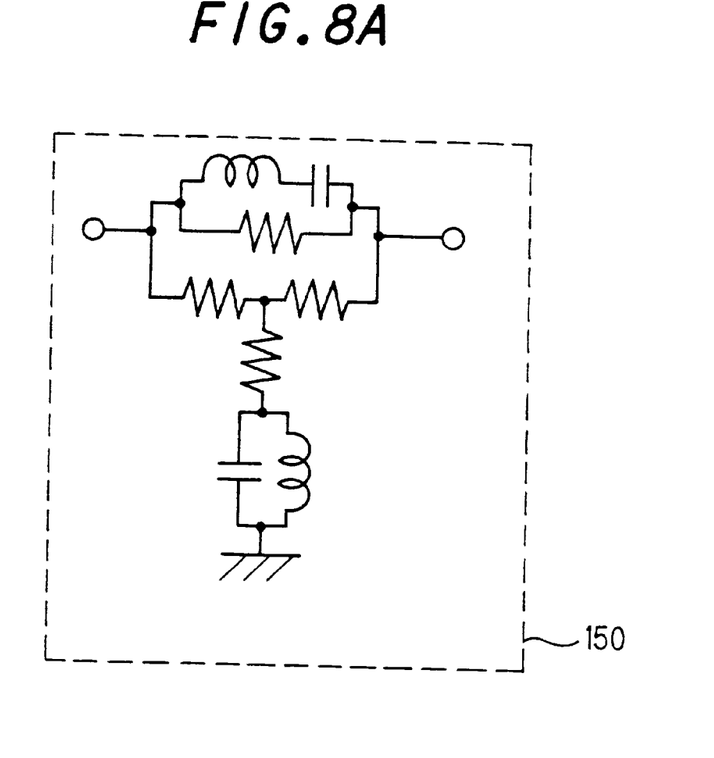
Figure 8B:
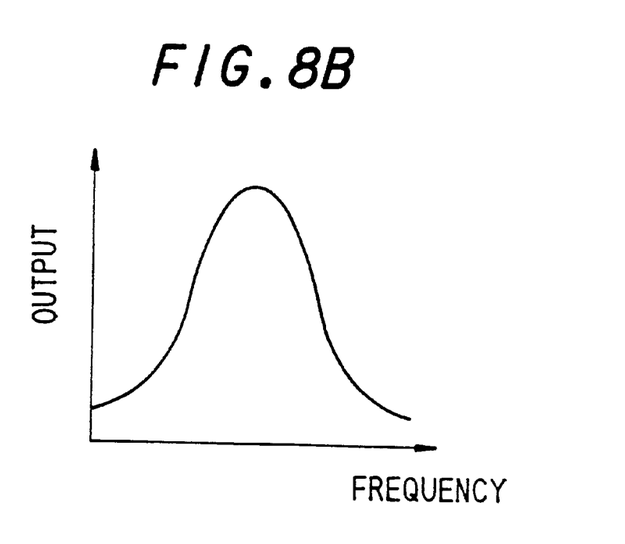

The pre-emphasizer 140 for modifying the frequency spectrum of the super wide-band FM signal 40 can be approximately realized by a circuit shown in FIG. 7A. The frequency characteristic of the transmitted signal level of the circuit 140 is shown in FIG. 7B. On the other hand, the de-emphasizer 150 can be approximately realized by a circuit shown in FIG. 8A. The frequency characteristic of the transmitted signal level of the circuit 150 is shown in FIG. 8B.

As mentioned above, the super wide-band FM signal generated by the FM modulator passes through the pre-emphasizer, in which the frequency spectrum of the signal is so modified that its spectral component increases, as frequency deviates from its center frequency, and is converted into an optical signal and propagated through an optical fiber. At the receiving end of the optical fiber, the optical signal is optical/electrical-converted by a photodiode, and the output signal thereof is supplied to the de-emphasizer, in which the frequency spectrum of the supplied signal is modified in an inverse way of that of the pre-emphasizer, hence, the spectrum of the received super wide-band FM signal recovers its initial spectrum, i.e. that of the output signal of the FM modulator. Although the white noise is superposed on the super wide-band FM signal, while the optical signal propagates through the optical fiber, the spectral component of the noise decreases, as frequency deviates from the center frequency, after the super wide-band FM signal passes through the de-emphasizer. When the output signal of the de-emphasizer is demodulated, the level of noise involved in the output signal of the demodulator is constant over the whole frequency range, hence, the SNRs of the all sub-carriers are nearly equalized.

Figure 9:
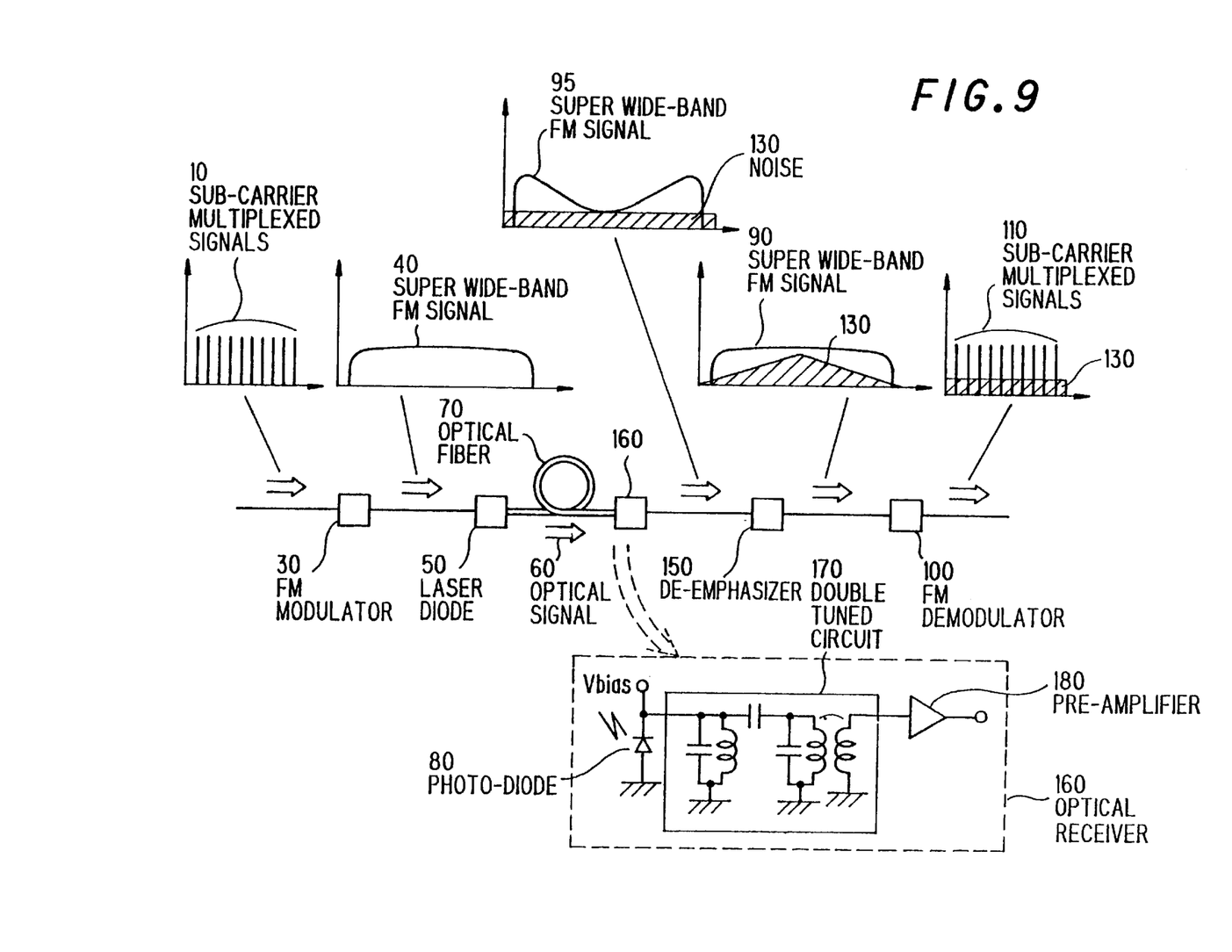
FIG. 9 is a block diagram showing a structure of the third preferred embodiment of the invention.

FIG. 9 is a block diagram showing the structure of the third preferred embodiment of the invention. The difference of the features between the second and third preferred embodiments is that, although the frequency spectrum of the super wide-band FM signal 40 is modified by the pre-emphasizer 140 in the second preferred embodiment, the same is modified by an optical receiver 160 having a spectrum-modifying-property in the third preferred embodiment of the invention. The optical receiver 160 is composed of a photodiode 80, a double-tuned circuit 170 having tuning frequencies of 1200 MHz and 2800 MHz and a pre-amplifier 180, and converts an input optical signal 60 into an electrical signal. The output signal 95 of the optical receiver 160 becomes maximal at the aforementioned tuning frequencies, and decreases as frequency deviates from the tuning frequencies. The signal component 95 of the output signal of the optical receiver 160 is converted into a super wide-band FM signal 90 having the same frequency spectrum as that of the super wide-band FM signal 40, the output signal of the FM modulator 30. This signal is demodulated by FM demodulator 100 and supplied to a next stage.

As mentioned in the above, since the optical receiver comprises a double tuned circuit, a transimpedance of which becomes lower, as frequency deviates from the center frequency of the frequency spectrum of the super wide-band FM signal, the intensity of the super wide-band FM signal supplied from the optical receiver becomes higher, as frequency deviates from the center frequency thereof, while the frequency spectrum of a noise generated by the optical receiver is nearly flat. By applying the output voltage of the optical receiver to the de-emphasizer, the frequency spectrum of the received super wide-band FM signal recovers the same spectrum as that of the output signal of the FM modulator. On the other hand, in the de-emphasizer, the white noise superposed on the super wide-band FM signal is converted into a particular noise, a spectral component of which decreases, as frequency deviates from the center frequency of its spectrum. Accordingly, the frequency spectrum of a noise in the output signal of the FM demodulator is nearly flat over the whole frequency range, and the SNRs of the all sub-carriers are nearly equalized.

Although the VSB-AM scheme is applied to each sub-carrier in the three aforementioned embodiments, other analog modulation schemes, such as FM or PM, and digital modulation schemes such as PSK, QAM or VSB-ASK can be applicable, too. In case plural modulation schemes are simultaneously applied, the intensities of the corresponding carriers should be selected taking distortions and resistance to noise of the respective modulation schemes into consideration.

Moreover, when selecting the way for modifying the spectrum of the super wide-band FM signal, various curves for modifying the spectrum of the aforementioned signal can be selected under the condition that, the spectral component of the super wide-band FM signal is small near its center frequency, and becomes larger, as frequency deviates from the center frequency. Circuits other than those shown in the aforementioned embodiments can be used as the pre-emphasizer and de-emphasizer. For example, a filter of another kind, having a similar frequency characteristic and a different circuit structure, such as an active filter or a ceramic filter, can be employed.

As mentioned above, in the optical sub-carrier multiplexed signal transmission system employing super wide-band frequency modulation scheme according to the invention, by increasing intensities of sub-carriers showing lower SNRs after demodulation, including those of higher sub-carrier frequencies, and returning them to their initial values before or after demodulation, the SNRs of the aforementioned sub-carriers can be equalized. Accordingly, an allowable transmission loss can be increased, and the transmission distance can be extended.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A method for sub-carrier multiplexed optical signal transmission, in which
    said sub-carrier multiplexed signals modulate a frequency of a main carrier to provide a single FM signal,
    said single FM signal modulates a signal emitted by a transmitter laser diode to generate an optical signal to be transmitted through an optical fiber, and
    said optical signal at a receiving end of said optical fiber is converted into received sub-carrier multiplexed signals, said method comprising the step of:
    modulating said frequency of said main carrier so that sub-carriers showing lower signal to noise ratios after demodulation modulate said frequency of said main carrier more than other sub-carriers.

2. A method for sub-carrier multiplexed optical signal transmission, in which
    sub-carrier multiplexed signals modulate a frequency of a main carrier to provide a single FM signal,
    said single FM signal modulates a signal emitted by a transmitter laser diode to generate an optical signal to be transmitted through an optical fiber, and
    said optical signal at a receiving end of said optical fiber is converted into received sub-carrier multiplexed signals, said method comprising the step of:
    so modifying a frequency spectrum of said single FM signal so that a spectral component thereof becomes larger, as its frequency deviates from a center frequency of said frequency spectrum.

3. A sub-carrier multiplexed optical signal transmitting apparatus comprising:
    a pre-emphasizer for increasing intensities of sub-carriers showing lower signal to noise ratios after demodulation more greatly than those of other sub-carriers,
    a FM modulator for converting a main carrier into a single FM signal by an output signal of said pre-emphasizer,
    an optical modulator for modulating a signal light by said single FM signal to provide an optical signal, an optical fiber for propagating said optical signal therethrough, an optical receiver for optical/electrical-converting said optical signal propagated through said optical fiber into a single received FM signal, a FM demodulator for converting said single received FM signal into received sub-carrier multiplexed signals, and a de-emphasizer for decreasing intensities of sub-carriers having higher intensities in said received sub-carrier multiplexed signals than those of other sub-carriers.

4. A sub-carrier multiplexed optical signal transmitting apparatus comprising:

a FM modulator for converting a main carrier into a single FM signal by sub-carrier multiplexed signals, a pre-emphasizer for so modifying a frequency spectrum of said single FM signal that a frequency spectral component thereof increases, as its frequency deviates from a center frequency of said frequency spectrum, an optical modulator for modulating a signal light by said single FM signal to provide an optical signal, an optical fiber for propagating said optical signal therethrough, an optical receiver for optical/electrical-converting said optical signal propagated through said optical fiber into a single received FM signal, a de-emphasizer for so modifying a frequency spectrum of said single received FM signal that a spectral component of said single received FM signal is decreased, as its frequency deviates from a center frequency of a spectrum of said single received FM signal, and a FM demodulator for demodulating an output signal of said de-emphasizer having said modified frequency spectrum.

5. A sub-carrier multiplexed optical signal transmitting apparatus comprising:

a FM modulator for converting a main carrier into a single FM signal by sub-carrier multiplexed signals, an optical modulator for modulating a signal light by said single FM signal to provide an optical signal, an optical fiber for propagating said optical signal therethrough, an optical receiver, which optical/electrical-converts said optical signal propagated through said optical fiber into a single received FM signal and has a transimpedance that decreases as frequency deviates from a center frequency so as to apply a frequency modification to a spectrum of said single received FM signal, a de-emphasizer for modifying a frequency spectrum of an output signal of said optical receiver inversely to said frequency modification applied by said optical receiver, and an FM de-modulator for converting an output signal of said de-emphasizer into received sub-carrier multiplexed signals.

* * * * *